US008433768B1

(12) United States Patent
Bush et al.

(10) Patent No.: US 8,433,768 B1
(45) Date of Patent: Apr. 30, 2013

(54) EMBEDDED MODEL INTERACTION WITHIN ATTACK PROJECTION FRAMEWORK OF INFORMATION SYSTEM

(75) Inventors: Stephen Francis Bush, Latham, NY (US); Amit Bhavanishankar Kulkarni, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1911 days.

(21) Appl. No.: 10/965,249

(22) Filed: Oct. 14, 2004

(51) Int. Cl.
*G06F 15/16* (2006.01)
*G06F 9/455* (2006.01)
*G06F 11/00* (2006.01)

(52) U.S. Cl.
USPC ................ 709/207; 709/246; 703/23; 726/22

(58) Field of Classification Search .................. 709/207, 709/246
See application file for complete search history.

(56) References Cited

U.S. PATENT DOCUMENTS

| 5,276,677 | A | 1/1994 | Ramamurthy et al. |
| 5,485,409 | A | 1/1996 | Gupta et al. |
| 5,684,957 | A | 11/1997 | Kondo et al. |
| 5,887,029 | A | 3/1999 | Husted et al. |
| 5,892,903 | A | 4/1999 | Klaus |
| 6,088,804 | A | 7/2000 | Hill et al. |
| 6,195,700 | B1 | 2/2001 | Bender et al. |
| 6,424,358 | B1* | 7/2002 | DiDomizio et al. ........... 715/762 |
| 6,434,606 | B1* | 8/2002 | Borella et al. ................ 709/214 |
| 6,498,968 | B1 | 12/2002 | Bush |
| 6,536,040 | B1* | 3/2003 | Curtis ........................... 717/174 |
| 6,606,744 | B1* | 8/2003 | Mikurak ....................... 717/174 |
| 6,697,876 | B1* | 2/2004 | van der Veen et al. ........ 719/313 |
| 6,907,395 | B1* | 6/2005 | Hunt et al. ....................... 703/21 |
| 6,922,813 | B1* | 7/2005 | Korenshtein .................. 715/762 |
| 7,246,156 | B2* | 7/2007 | Ginter et al. .................. 709/217 |
| 7,379,857 | B2* | 5/2008 | Piesco ............................. 703/21 |
| 7,464,410 | B1* | 12/2008 | Halasz et al. .................... 726/23 |
| 7,620,985 | B1 | 11/2009 | Bush et al. |
| 2002/0007289 | A1* | 1/2002 | Malin et al. ....................... 705/4 |

(Continued)

FOREIGN PATENT DOCUMENTS

| WO | 0070463 | 11/2000 |
| WO | 0248959 | 6/2002 |

OTHER PUBLICATIONS

"Active Virtual Network Management Prediction: Complexity as a Framework for Prediction, Optimization, and Assurance", Stephen F. Bush, General Electric Corporate Research andDevelopment; arXiv:cs.NI/0203014 v1; Mar. 11, 2002.

(Continued)

*Primary Examiner* — Guang Li
(74) *Attorney, Agent, or Firm* — Howard IP Law Group, PC

(57) ABSTRACT

An information system includes a bulletin board-type interface that enables virtual messages propagating through the system, to interface with one another. The virtual messages are created by a virtual system embedded within the information system. The virtual messages may model any of various network services and predict traffic based on the network services. The virtual messages may represent an attack model on the network. Models of system resources are also created and the models interact by posting and/or retrieving information from the bulletin board-type interface. The interface provides for a negotiation process regarding the availability of future system resources and the impact upon the modeled network service.

23 Claims, 1 Drawing Sheet

U.S. PATENT DOCUMENTS

| | | | |
|---|---|---|---|
| 2002/0052862 A1* | 5/2002 | Scott et al. | 707/1 |
| 2003/0056194 A1 | 3/2003 | Iglesias | |
| 2003/0097588 A1* | 5/2003 | Fischman et al. | 713/200 |
| 2003/0182582 A1* | 9/2003 | Park et al. | 713/201 |
| 2003/0208505 A1 | 11/2003 | Mullins et al. | |
| 2004/0025018 A1 | 2/2004 | Haas et al. | |
| 2004/0054505 A1 | 3/2004 | Lee | |
| 2004/0103147 A1* | 5/2004 | Flesher et al. | 709/204 |
| 2004/0177110 A1* | 9/2004 | Rounthwaite et al. | 709/202 |
| 2004/0181664 A1* | 9/2004 | Hoefelmeyer et al. | 713/157 |

OTHER PUBLICATIONS

USENIX Association, "Proceedings of the 14th Systems Administration Conference" New Orleans, LA, Dec. 3-8, 2000 "Analyzing Distributed Denial of Service Tools: The Shaft Case", Dietrich et al. School of Computer Science, Carnegie Mellon University "An Extensible Toolkit for Resource Prediction in Distributed Systems", Dinda et al, Jul. 1999, CMU-CS-99-138.

"Computer-Attack Graph Generation Tool" Swiler et al., 2001 IEEE, 0-7695-1212-7/01.

S.F.Bush and A.B. Kulkarni Active Networks and Active Network Management: a Proactive Management Framework, Kluwer Academic/Plenum Publishers, ISBN 0-306-46560-4, 2001.

S. Kauffman. At home in the universe: The search for laws of self-organization and complexity. Oxford University Press, Oxford, 1995.

U.S. Appl. No. 12/579,456, entitled, "Flood Attack Projection Model", in the name of Bush, et al.

Abandoned U.S. Appl. No. 10/964,879, entitled, "Embedded real-time information system cyber attack damage assessment method and system", in the name of Bush, et al.

Bush, S.F., "Active Virtual Network Management Prediction: Complexity as a Framework for Prediction, Optimization and Assurance", General Electric Corporate Research and Development, arXiv:cs.NI/0203014 vi; Mar. 11, 2002.

Dietrich et al, "Analyzing Distributed Denial of Servie Tools: The Shaft Case", USENIX Association, "Proceedings of the 14th Systems Administration Conference" New Orleans, LA, Dec. 3-8, 2000, pp. 329-339.

Dinda et al, "An Extensible Toolkit for Resource Prediction in Distributed Systems", School of Computer Science, Carnegie Mellon University, Jul. 1999, CMU-CS-99-138, pp. 1-34.

Swiler et al, "Computer-Attack Graph Generation Tool", 2001 IEEE, 0-7695-1212-7/01, pp. 307-321.

Bush, S.F. et al, "Active Networks and Active Network Management, A Proactive Management Framework", 2001 Kluwer Academic/Plenum Publishers, New York, Chapters 7 and 9.

Bush, S.F. et al, "Active Virtual Network Management Protocol", General Electric Corporation Research and Development, 13th Workshop on Paralled and Distributed Simulation, May 1-4, 1999 Atlanta, Georgia, USA, PASD '99.

Bush, S.F. et al, "Islands of Near-Perfect Self-Prediction", General Electric Corporation Research and Development, Virtual Worlds Simulation Conference '00 and 2000 Western MultiConference, Jan. 2000.

\* cited by examiner

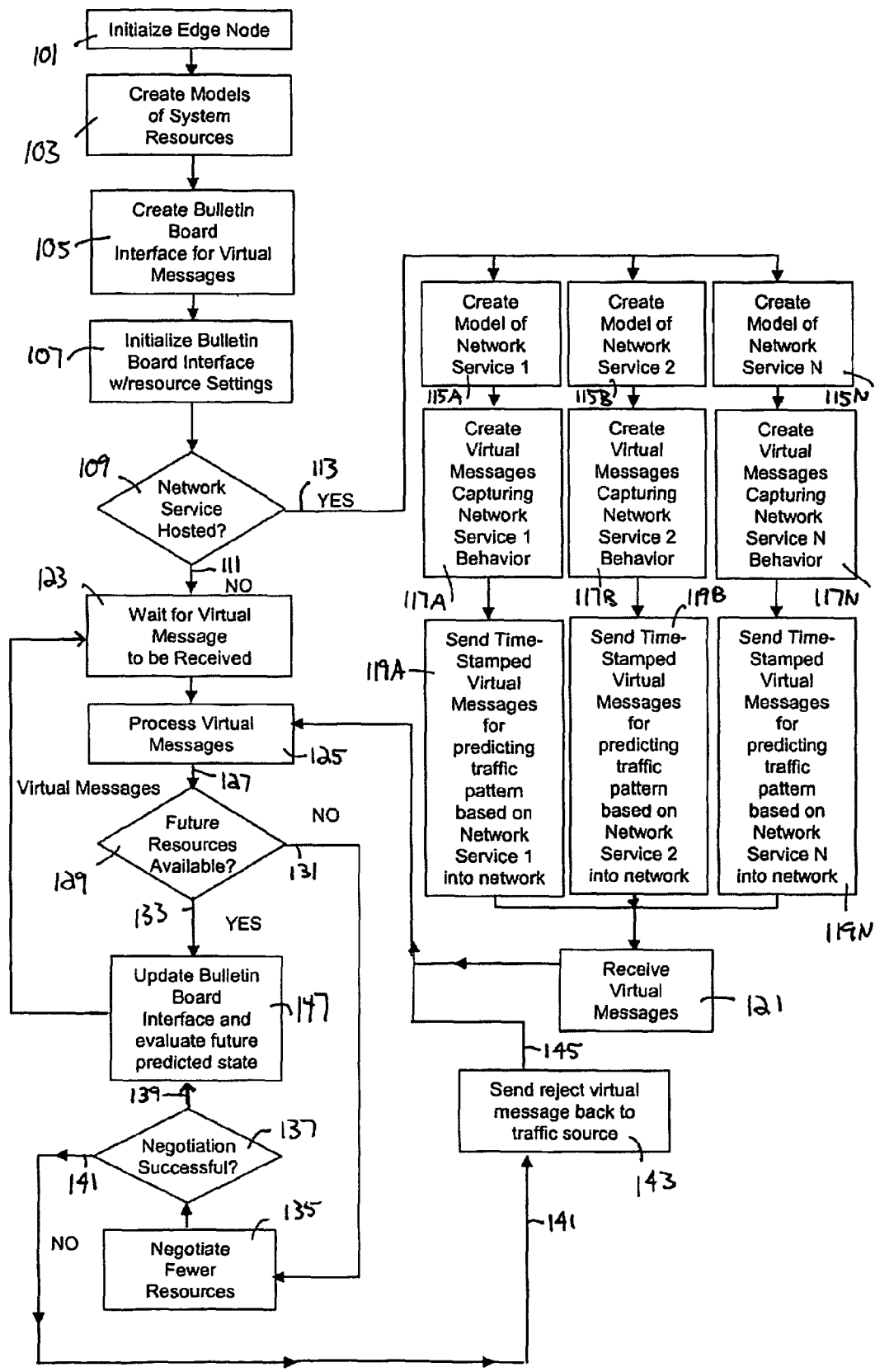

EMBEDDED MODEL INTERACTION WITHIN ATTACK PROJECTION FRAMEWORK OF INFORMATION SYSTEM

FIELD OF THE INVENTION

The present invention relates to information systems, particularly to the interaction of multiple embedded predictive models. The models utilize parallel discrete event simulation and communicate using messages carrying information expected to exist in the future. These messages are known as virtual messages and the present invention elucidates how virtual messages from multiple embedded predictive models interact in an efficient and coherent manner.

BACKGROUND

Electronic information systems including communication networks and various computer networks have become prevalent and relied-upon in all aspects of today's society. This is true in the technological community, business and industry, the military, government and in various other areas of information technology and communications. Many businesses, technologies, governments and people are critically dependent upon the uninterrupted and reliable operation of these information systems. An information warfare or other attack on such an information system can disable the system and bring activity to a standstill. The impact of such an attack may be devastating and therefore such attacks upon information systems must be prevented. Measures should be taken to study the attacks that may occur, predict when they may occur and also predict their impact upon the information system. Understanding the impact of an expected attack increases information assurance for mission critical components of a communication network.

It is difficult to assess the impact such an attack would have on a system without actually running the attack on the system. This is obviously undesirable because if the attack is actually run on the system, it may destroy or disable the system. One way to study the impact of an attack upon an information system is to simulate the attack using models of the attack, the target and the system. U.S. patent application Ser. No. 10/964,879 entitled Embedded Real-Time Information System Cyber Attack Damage Assessment Method and System and U.S. patent application Ser. No. 10/965,248 entitled Flood Attack Projection Model, each by the applicant inventors, describe various aspects of such a system and are each hereby incorporated by reference as if set forth in their entireties. In order to evaluate the impact of the simulated attack upon the system, the models need to interact with each other without affecting the simultaneously operating information system.

In other information systems, models of other network services may be created and propagate through the information system, and these models will similarly need to interact with other models of the systems in order to assess the impact of one of the system models upon the behavior of the other system model or models.

It would therefore be desirable to provide an information system or communication network in which such models could so interact.

SUMMARY OF THE INVENTION

To address these needs and in view of its purposes, the invention provides an information interface in an information system that includes a virtual system embedded therein. The information interface comprises receiving means for receiving virtual messages and further virtual messages, information storage means for storing information provided by the virtual messages, and code that enables the further virtual messages to interact with the virtual messages.

A method for operating an information system is also provided. The method includes providing an information system with a virtual system and an information interface embedded therein, causing the virtual system to generate first virtual messages and second virtual messages, and the first virtual messages interfacing with the second virtual messages by way of the information interface

BRIEF DESCRIPTION OF THE DRAWING

The invention is best understood from the following detailed description when read in conjunction with the accompanying drawing. Included is FIG. 1 which is a flow chart showing the operation of an exemplary interface system.

DETAILED DESCRIPTION

An aspect of the invention provides for the interaction of models generated by a virtual system embedded as an integral part of an actual information system. The information system may be a computer network or a communication network including at least one computer network and at least parts of the information system may be wireless. The virtual system generates various virtual messages that propagate deep within the information system such as at the network level. The models may model of various network services, the behavior of such network services and the traffic associated with such services. The models may also model system resources. The models may simulate a system attack, a target of the attack, the infrastructure of the information system, or various other network services. In one embodiment, a potential attack upon the information system may be simulated and its effects upon the infrastructure assets of the information system and/or system resources, may be forecasted. More generally, the effect of a model of one network service upon another network service may also be simulated. The models may be virtual messages that interact by means of a "bulletin board" interface embedded within the system.

The virtual messages may be generated and propagate as described in previously incorporated U.S. patent application Ser. No. 10/964,879 entitled Embedded Real-Time Information System Cyber Attack Damage Assessment Method And System. An algorithmically compressed model such as an attack model is injected to the network level of the information system and may include code. Active networking may advantageously be used to inject the packets carrying code from the application level to the network level of the information system. In one exemplary configuration, an Atropos architecture may be utilized in the information system. Atropos architecture is based upon the AVNMP or Active Virtual Network Management Prediction and advantageously benefits from the use of active networking and provides the ability to use fine-grained executable models in the network to enhance communication. Atropos is comprised of driving processes, logical processes, and virtual messages. The active virtual network management prediction and the use of active networks is discussed in S. F. Bush and A. B. Kulkarni, Active Networks and ActiveNetwork Management: A Proactive Management Framework, Kluwer Academic/Plenum Publishers, ISBN 0-306-46560-4, 2001, the contents of which are herein incorporated by reference as if set forth in their entirety.

In one exemplary configuration, the model may be inserted by injecting a description from a java properties file into the system. A java properties file stores the model, which may be a description of a system attack or a description of other network service behavior in other exemplary embodiments. Java programming language is known in the art and java property files are simple text files which are also known in the art. Information from the java properties files is used to generate virtual messages that model the system, traffic within the system, a target within the system, the behavior of various network services, or system resources. A virtual message is a packet, either active or passive, that carries state information anticipated to exist in the future. In one exemplary embodiment, the virtual message contains executable code. In another embodiment, the virtual message does not carry executable code but carries an active packet facilitating prediction by carrying code that affects a node's notion of time. Such a virtual message may be referred to as a strepthichron. Fine-grain executable models carried by strepthichrons are introduced as active packets that are expected to exist in the future and which carry executable code necessary to represent future behavior. The executable code used to represent future behavior is designed in a more compact form than the transmitting equivalent (static, non-executable data in a piece-meal fashion), as the algorithmic nature of the strepthichron allows for high compression. The virtual messages propagate through the information system in a conventional manner.

In order to study the effect of system models carried by virtual messages, upon other system models carried by further virtual messages, the virtual messages and further virtual messages interact at the bulletin board interface. The bulletin board type interface stores information provided by the virtual messages and allows the virtual messages to post information to, and retrieve information from, the interface. The bulletin board interface thus enables virtual messages to communicate with other virtual messages. The bulletin board interface may, therefore, find utility in an exemplary system in which first virtual messages describe a model of network service or system traffic such as a flood attack model, and second virtual messages simulate another system model. The interaction of the virtual messages may thus allow for a simulated attack and its impact, to be analyzed.

The virtual messages which are created and propagate through the system may describe and/or contain information on various network services. A network service is any kind of application that sends traffic, i.e. packets, throughout the network. Examples of network services include video services, distributed network services (DNS), distributed host configuration protocol (DHCP) services, and there are various other network services that may be described/modeled. Since a model (virtual messages) capturing the various network services may be created, and since the models may also predict the traffic pattern injected into the network by the respective network service, the model of the network service may be an attack model such as a flood attack in which various network services may become inaccessible, or a denial-of-service attack in which excessive traffic creates problems such as degraded video quality.

In the following exemplary embodiment, the virtual messages represent an attack model such as a flood or denial-of-service attack, and a model of normal system behavior, but it should be understood that such models are exemplary and not restrictive of the invention.

In such an exemplary embodiment, an attack projection method and system act as an active middleware security service to forecast the effects of an attack on infrastructure assets of the information system. The attack projection takes into account the capability of the system and nature of the attack as well as the legitimate network usage expected to exist at the time of an attack and also allows for interaction. Provided is an architecture developed for active middleware service that safely projects forward a predicted attack through the information system, while also projecting forward a model of legitimate network usage expected to exist during the attack, to determine the impact of the attack on the network Attack models used for the attack projection do not impact the actual system because they are "virtualized" and injected into the virtual plane embedded within the system. An accurate analysis of the impact of the attack and a reliable determination of the system's response to the attack may take place during normal operation of the information system and have negligible or no effect on the operating network in an attack projection system that simulates an attack using virtual messages, such as described in U.S. patent application Ser. No. 10/964,879 entitled Embedded Real Time Information System Cyber Attack Damage Assessment Method and System, previously incorporated. The attack model may represent bursty traffic, flash crowds, and steady high attacks. The attack model may be a disclosure of information model such a model of a malicious program observing information flow, a corruption of information attack comprised of a model of an attack in which data is maliciously modified in route, or a spoof attack in which data is injected into the network as though it originated from a legitimate source or other models. The models are injected into the network at the entry points at which the particular attack model is predicted to occur. According to one exemplary flood attack embodiment, the flood attack model may include information on starting time, flood load, destination (unicast, multicast, or broadcast), and end time. Virtual flood messages are injected and propagate through the network as the actual flood would and update the logical processes with corresponding loss of bandwidth for legitimate traffic, for example.

Continuing in the attack model example, system models of normal operation of components of the information system, are also injected into the system by way of further virtual messages. The further virtual messages represent a model of the behavior of system components under normal operation. These virtual messages may be packets carrying code describing components of the information system. The system components may be chosen to be components that are most susceptible to attack. The system component models are projected forward in time along with the attack model. Each of the virtual messages is time-stamped, i.e., projected at a specific future time such as present time, "t plus x" seconds. The virtual messages of the attack model are processed by (i.e., interface with) those injected component models at the bulletin board interface to provide an understanding of the impact of the attack upon the model. As such, virtual messages that simulate an attack model and normal system operation during an attack, may be generated, propagate, and interact while the actual system operation is taking place uninterrupted.

In the Atropos virtual environment, the various virtual messages post and read information to and from the bulletin board. Virtual messages interact with each other by exchanging information through the bulletin board-like interface. The bulletin board interface is created and programmed using code that enables the bulletin board interface to store information and for the information to be accessed by further virtual messages. In a sense, the bulletin board interface allows the posted data to be compared. Conventional information storage means may be used to store the data and receiving means for receiving the information/data may also be conventional and may be programmed using conventional means for creating data summary storage tables and the like. The interface system therefore includes receiving means to receive the time-stamped virtual messages posted by the bulletin board interface, information storage means for storing information provided by or hosted by the virtual messages and it may include code that enables the virtual messages to interact with each other, i.e., read or reference information from other virtual messages. An example of receiving means may be a specific network port on the target system at which all virtual messages are received and processed by a service listening on that port. Another example may be an active network node in which case an Application Programming Interface (API) could exist for the bulletin board interface to enable code in the active packets to interact with the bulletin board. An exemplary embodiment of information storage means is a table of rows and columns, wherein each row is indexed by the future time value and contains the name of the resource and its value at the future time instant. The bulletin board interface organizes data and provides an association between time, the type of the resource, and its value. The time-stamped messages are stored in time order. The information may consist of resource usage of the application being modeled. Some of the virtual messages post information such as resource information to the interface, some virtual messages read the information from the interface, and some virtual messages do both. The virtual messages may post to the bulletin board, information about the resources it might need at specific times in the future. Resources include bandwidth (link load) cpu utilization, memory, number of packets received, number of packets transmitted, number of cpu cycles, and the like. The interface between the virtual messages may include a negotiation process as described below.

Aspects of an exemplary embodiment of the invention are shown in the flowchart of FIG. 1. The bulletin board interface is installed on an edge node such as a computer. The edge node itself is initialized at step 101. The flowchart of FIG. 1 illustrates a single node of the system and may be representative of each of the plurality of nodes included in the information system. Models of system resources are created at the edge node at step 103. These models may model the process and resources of the system and model how the system behaves in a particular manner. The models may include minimum and maximum limits of the system resources or they may be adaptive models. System resources may include bandwidth (link load), cpu utilization, memory, number of packets received, number of packets transmitted, number of cpu cycles, input/output buffer capacity and the like. Conventional programming may be used. The bulletin board interface for virtual messages is created at step 105. The bulletin board interface may be a table or linked list programmed into the system and may include code that creates a relationship between the entries. The bulletin board interface stores related, e.g., time associated, information together. In other embodiments, other techniques for storing and comparing data summaries may be used. The table or other data summary arrangement may include columns or other indexing means that stores system resources or other entries in a time-stamped manner and provides relationships between the entries. The bulletin board interface may also store histories of various system resources. For example, an exemplary system resource may be available memory stored in units of megabytes and this resource may be modeled at a future time of current time plus "x". Other resources may include available output bandwidth measured in units of megabytes per second. System resources created at step 103 are storable at the bullet board interface. The interface allows for these entries to be posted thereto. It also receives virtual messages and allows the virtual messages to access, i.e. read information from the interface, such as stored system resources.

The bulletin board interface is initialized at step 107 with resource settings. Initial values may include available capacity for a particular system resource at any time. At step 109 it is determined whether a network service is hosted by the particular node. If no 111, then the information system waits for virtual messages to be received at step 123. If yes 113, models of network services 1-n are created at steps 115a, 115b . . . 115n, respectively. Although only network services 1, 2 and n are illustrated, it should be understood that these are exemplary and that various additional network services 3 to (n-1) may be included and modeled in similar steps such as might be labeled 115C, etc., 117C, etc., and 119C, etc. With respect to network service 1 (NS1) for example, virtual messages are created that capture the behavior of network service 1, as described above, at step 117A. The virtual messages may model traffic created by various kinds of attacks of network service 1. Time-stamped virtual messages for predicting traffic patterns based on network service 1 are sent into the network at step 119A. The various virtual messages from steps 119A, 119B and through 119N are received at step 121.

The virtual messages propagate through the system and are processed at step 125. Virtual messages 127 propagate and make requests regarding the availability of future resources. At step 129, a determination is made regarding the availability of future resources. The determination is based upon the traffic pattern of the network service which may be an attack simulation and it will further depend upon the initialization that took place at step 107 and the current value of the resource in the bulletin board information storage. If future resources are available, i.e. yes 133, the bulletin board interface is updated and future predicted states are evaluated such as described in previously incorporated U.S. patent application Ser. No. 10/964,879 entitled Embedded Real Time Information System Cyber Attack Damage Assessment Method And System. An example of this may be that a particular node includes a sufficient bandwidth to accommodate, at a particular future time, a certain volume of traffic projected by a flood attack model.

If future resources are not available, no 131, the bulletin board interface provides for a "negotiation" to take place between the virtual messages currently present at the node or with the corresponding network services generating the virtual messages. The negotiation takes place by either or both of the models posting time-stamped messages to the interface while retrieving the stored time-stamped information from the interface, or both. The negotiation includes sending requests about the information systems, responding to the requests and sending further requests responsive to the responses. The negotiation may include queries about system resources that may be available at a particular time in the future. The answer to the queries will depend upon the available resources in the virtual system and may initiate a negotiating process.

An example of a network resource model (103) may be an input/output buffer on a router, whose capacity is indicative of a system limitation such as memory. The success of the negotiation is determined at step 137 and if the negotiation is successful, yes 139, the bulletin board is updated at step 147. A successful negotiation would mean that the network service traffic modeled by the virtual messages has been accommodated. If the negotiation is not successful, no 141, a reject virtual message is sent back to the traffic source at step 143. In an exemplary negotiation, the input/output buffer model may indicate that the number of slots available to process packets is equal to 10 slots. At step 129, a virtual message that predicts traffic based on a network service may indicate that, at time t+x, a certain amount of data transmission will need to take place. For example, in an audio streaming network service, the network service model may indicate that 10 streams of audio packets will be traveling through the network at future time y, each stream including 5 packets per second. If the router through which these virtual audio packets will be transmitted, can only accommodate 5 such streams, then future resources are not available, no 131, and the system bulletin board interface provides for negotiation for fewer resources at step 135. The negotiation may include, for example, the virtual messages of network service 1 model requesting that the node accommodate less than the initially requested 10 streams, it may include the network service 1 model requesting the availability of another system. node to accommodate 10 streams or it may request the availability of another system node to accommodate part of the 10 streams. A reject virtual message such as sent at step 143 might be an initial indication that the original requested node cannot accommodate 10 streams. Should this occur, further, amended requests will then be sent, responsive to the rejection and the negotiation process will continue until resolved.

It should be understood that the previous exemplary embodiment dealing with the audio streaming service and audio packets transmitted through the network is exemplary only and that the traffic model of the audio streaming service and the streams of audio packets transmitted through the network are exemplary only. The system resource of the router buffer is also exemplary only and other system resource models may be used in various exemplary embodiments.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An information interface in an information system that includes a virtual system embedded therein, said information interface comprising:
a computer executing instructions for:
defining a bulletin board interface configured to store information provided by virtual messages, the bulletin board interface allowing said virtual messages to post information to and retrieve information from, said bulletin board interface;
receiving at said bulletin board interface, first virtual messages generated by a first predictive system model of said virtual system and second virtual messages generated by a second predictive system model of said virtual system each of said first and second virtual messages carrying state information of said virtual system expected to exist in the future;
storing in said bulletin board interface, said state information provided by said first and second virtual messages; and
interacting said first virtual messages with said second virtual messages via said stored state information.

2. The information interface system as in claim 1, wherein said first predictive system model comprises a first network service model and said second predictive system model comprises a second network service model.

3. The information interface system as in claim 1, wherein said first predictive system model comprises a virtual system attack model and said second predictive system model comprises a model of components of said information system.

4. The information interface system as in claim 1, wherein said information includes at least one of bandwidth, cpu utilization, input/output buffer capacity, and memory.

5. The information interface system as in claim 1, wherein said virtual messages are time-stamped messages of future states and wherein said virtual messages are stored in time order.

6. The information interface system as in claim 1, wherein said interacting includes negotiating said second virtual messages with said first virtual messages.

7. The information interface system as in claim 1, wherein said interacting includes said first virtual messages posting information to said information interface and said second virtual messages reading said information from said information interface.

8. A method for operating an information system comprising:
providing, in a computer process, an information system with a virtual system and an information interface embedded therein, wherein said information interface defines a bulletin board interface configured to store information provided by virtual messages, the bulletin board interface allowing said virtual messages to post information to, and retrieve information from, said bulletin board interface;
causing, in a computer process, first and second predictive system models of said virtual system to respectively generate first virtual messages and second virtual messages, each of said first and second virtual messages carrying state information of said virtual system expected to exist in the future; and
in a computer process, said first virtual messages interfacing with said second virtual messages by way of said bulletin board interface.

9. The method as in claim 8, wherein said first virtual messages interfacing comprises said first virtual messages posting information to said information interface and said second virtual messages reading said information from said information interface.

10. The method as in claim 9, wherein at least one of said second virtual messages post further information to said information interface, and said first virtual messages read said further information from said information interface.

11. The method as in claim 8, wherein said first virtual messages interfacing includes storing information provided by at least one of said first virtual messages and said second virtual messages at said information interface.

12. The method as in claim 11, wherein said causing includes said first virtual messages being time-stamped and including information on future states at identified future times and said storing comprises storing in time order.

13. The method as in claim 11, wherein said information includes information on resources of said information system.

14. The method as in claim 13, wherein said resources comprise at least one of bandwidth, memory, cpu utilization, number of packets sent, buffer capacity, number of packets transmitted, and cpu cycles.

15. The method as in claim 11, wherein said first virtual messages are time-stamped and further comprising said second virtual messages querying about future states of said information system.

16. The method as in claim 15, further comprising negotiating after said querying.

17. The method as in claim 8, wherein said first virtual messages interfacing comprises said first virtual negotiating with said second virtual messages.

18. The method as in claim 17, wherein said negotiating comprises sending requests about information system resources and responding to said requests.

19. The method as in claim 8, wherein said negotiating further comprises sending amended requests responsive to said responding.

20. The method as in claim 8, wherein said first predictive system model comprises a system attack model and said second predictive system model comprises a model of normal operation of said information system.

21. The method as in claim 20, wherein said system attack model comprises one of a flood attack model and a denial-of-service attack model.

22. The method as in claim 8, wherein at least one of said first virtual messages and said second virtual messages carry code.

23. The method as in claim 8, wherein at least one of said first predictive system model and said second predictive system model comprises a model of a network service.

* * * * *